United States Patent [19]

Brock et al.

[11] 4,218,145

[45] Aug. 19, 1980

[54] LIQUID ASPHALT WEIGH OUT SYSTEM

[75] Inventors: James D. Brock; Erbie G. Mize, both of Chattanooga, Tenn.

[73] Assignee: Astec Industries, Inc., Chattanooga, Tenn.

[21] Appl. No.: 20,266

[22] Filed: Mar. 14, 1979

[51] Int. Cl.³ .............................................. B28C 7/04
[52] U.S. Cl. ......................................... 366/18; 366/8
[58] Field of Search ................. 366/8, 16, 17, 18, 141, 366/152, 160

[56] References Cited

U.S. PATENT DOCUMENTS

| | | | |
|---|---|---|---|
| 2,684,267 | 7/1959 | Madsen | 366/18 X |
| 2,893,602 | 7/1959 | Barber | 366/18 |
| 3,741,532 | 6/1973 | Farnham | 366/141 |
| 3,809,373 | 5/1974 | Brock | 366/18 |
| 4,089,509 | 5/1978 | Morton | 366/17 |

*Primary Examiner*—Edward J. McCarthy
*Attorney, Agent, or Firm*—Jones, Thomas & Askew

[57] ABSTRACT

Apparatus and method for measuring out liquid asphalt gravimetrically. The apparatus comprises a plurality of tanks for containing liquid asphalt, each tank being suspended from a load cell, a series of pipes, valves and a pump for selectively filling the tanks with asphalt and a series of pipes, a valve and a variable rate pump for selectively removing the liquid asphalt from the tanks. The load cells are connected to a control circuit which converts the signals from the load cells into the corresponding weight of the tanks and the liquid asphalt contained therein. The control circuit is also connected to the variable rate pump to control the rate at which liquid asphalt is removed from the tank in response to the load cells.

19 Claims, 3 Drawing Figures

LIQUID ASPHALT WEIGH OUT SYSTEM

TECHNICAL FIELD

The present invention relates in general to a system for measuring out liquid asphalt for a drum mix plant, and particularly to such a system in which the liquid asphalt is measured out gravimetrically.

BACKGROUND OF THE INVENTION

In drum mix plants where an asphalt-aggregate product is being produced, virgin aggregate or a combination of virgin aggregate and used asphalt-aggregate material are introduced to a rotating drum for heating and mixing. While the aggregate material is being mixed and heated in the drum, liquid asphalt is introduced into the drum to coat the aggregate material. In order to achieve proper coating of the aggregate material, sufficient liquid asphalt must be provided. However, in order to avoid waste, and to meet strict specifications for the composition of the mixed asphalt-aggregate material, liquid asphalt must be provided at a particular rate, depending on the grade composition of the aggregate. Proper coating of the aggregate material thus requires a carefully measured amount of liquid asphalt per unit volume of the selected aggregate material.

Methods for determining the amount of aggregate material being processed through the drum are known in the art. Given the amount of aggregate material, the prior art devices have measured out the necessary amount of liquid asphalt using volumetric displacement meters including gears which are driven by the flow of liquid asphalt at a rate proportional to the flow. Volumetric measurement, however, has inherent disadvantages. For example, volumetric measurement of liquid asphalt is temperature dependent. Since asphalt is a semi-solid material at normal ambient temperatures, it must be heated to maintain it in a liquid, flowable state. However, the hotter the liquid becomes, the more volume it occupies. Volumetric meters are used to deliver a constant volume, and therefore deliver less asphalt by weight when the material is hotter than would have been delivered if the material had been cooler, for a particular volume flow rate setting. Since it is difficult to keep the liquid asphalt at a constant temperature throughout the delivery system, temperature fluctuations lead to inaccuracies and fluctuations in the amount of liquid asphalt being combined with aggregate material. Therefore it is more difficult to comply with strict governmental composition standards. To overcome this problem, some prior art volumetric meters have included expensive temperature compensation circuitry and apparatus.

Also, the meter for measuring out the liquid asphalt is expensive and must be calibrated, and the liquid asphalt must be finely filtered to prevent damage to the meter. As a result, the filter may become blocked by relatively small debris. The accuracy of such meters, which operate by counting revolutions of the gears caused by the flow, is compromised by the fact that pockets of air trapped in the line are not distinguished from the liquid asphalt. Furthermore, conventional meters are generally machined to fine tolerances, and, consequently, are prone to clogging, damage and breakdown. It is therefore often necessary to maintain a second meter to replace a malfunctioning meter lest the entire drum mix plant be shut down during repair of the meter.

With volumetric displacement meters, it is usually necessary to perform an initial calibration operation before the meter may be used. This operation often involves pumping many gallons of liquid asphalt through the meter to thereby correlate the number of turns of the gears of the meter to the amount of liquid asphalt flowing through the meter. This is generally a costly and a time consuming operation.

SUMMARY OF THE INVENTION

The present invention relates to a method and apparatus for gravimetrically measuring out liquid asphalt. Generally described, the present invention comprises a container for liquid asphalt; a weighing means for continuously measuring the weight of the container and the contents thereof; and a means for removing liquid asphalt from the container so as to reduce the weight of the container and its contents at a desired rate, independently of the volume rate of removal of the liquid asphalt.

An apparatus embodying the present invention comprises at least one tank for containing a quantity of liquid asphalt, said tank being attached to a load cell for measuring the weight of the tank and the liquid asphalt contained therein. A series of pipes, valves and pumps permits selective filling of the tank with liquid asphalt from a reservoir and selective removal of the liquid asphalt therefrom for use in a drum mix plant. A control circuit, which may be a microprocessor or constructed by one skilled in the art from other conventional circuit components once its functions are understood, is used to convert signals from the load cell into the corresponding weight of the tank and liquid asphalt contained therein. The control circuit also operates the valves for alternately filling and emptying the tanks when the system uses a plurality of tanks. As liquid asphalt is removed from the tank, the microprocessor continuously monitors the weight of the tank and liquid asphalt. The rate of weight loss therefrom is equal to the rate at which the liquid asphalt is being removed from the tank, independent of the volume rate of removal which may vary with temperature. The microprocessor, in response to this weight information, either speeds up or slows down the pump pumping liquid asphalt out of the tank to thereby attain a desired metered rate of liquid asphalt delivery from the tank.

Accordingly, an object of the present invention is to provide an improved liquid asphalt metering apparatus.

Another object of the present invention is to provide a liquid asphalt metering apparatus which measures out liquid asphalt gravimetrically.

A further object of the present invention is to provide liquid asphalt metering apparatus which does not require fine filtering of the liquid asphalt being metered therethrough, does not require machining to close tolerances, does not require calibration with liquid asphalt and whose accuracy is not temperature dependent.

Yet another object of the present invention is to provide a method of metering-out liquid asphalt gravimetrically.

These and other objects, features and advantages of the present invention will become apparent from a review of the following detailed description of the disclosed embodiment and the appended drawing and claims.

DETAILED DESCRIPTION OF THE DISCLOSED EMBODIMENT

Figure 1:
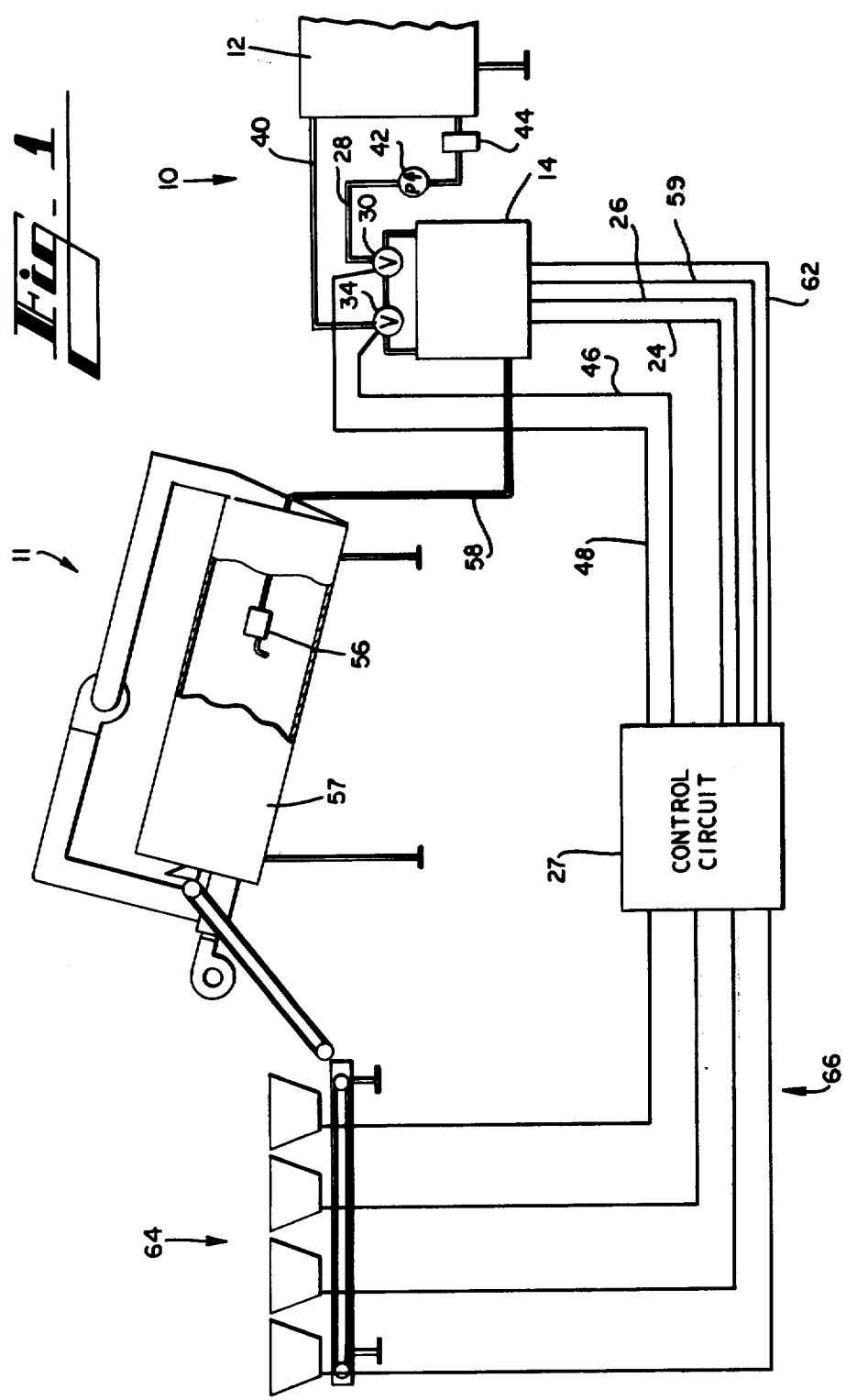
FIG. 1 is a schematic view of the disclosed embodiment of the liquid asphalt metering apparatus of the present invention as it would be used with a conventional drum mix plant.

Referring now to the drawing in which like numbers indicate like elements, throughout the several views, it will be seen that there is a liquid asphalt metering apparatus 10 disposed adjacent to a conventional drum mix plant 11 and a reservoir tank 12 containing a supply of heated liquid asphalt. The metering apparatus 10 comprises an enclosure 14 having two metering tanks 16, 18 disposed therein. The tanks 16, 18 are designed and constructed of such material as to be suitable for containing liquid asphalt therein. Each metering tank 16, 18 is suspended from a load cell 20, 22 which in turn is suspended from the top 15 of the enclosure 14. It will be appreciated the weight of the tanks 16, 18 and any material contained therein is borne and measured by the load cells 20, 22. Each load cell 20, 22 is connected by a lead 24, 26 to a control circuit 27.

The control circuit 27 may be a microprocessor of a type which is well known in the art and generally comprises programmed electric circuits for monitoring, regulating or controlling other electric devices and may also process signals received from electric devices to perform calculations thereon. Although the present invention is illustrated as using a microprocessor, it is specifically contemplated that other devices capable of performing similar functions and also within the skill of the art may be used instead of a microprocessor. Furthermore, although the precise design of the circuitry of the control circuit 27 is not shown, it will be understood that such design to provide the specific functions herein described is within the skill of the art.

The control circuit 27 is designed to receive signals from the load cells 20, 22, to convert those signals into the corresponding weight of the tanks 16, 18 and any material contained therein, and to control delivery of liquid asphalt from the metering apparatus 10 in responsive to such weights, in a manner described hereinbelow.

Figure 2:
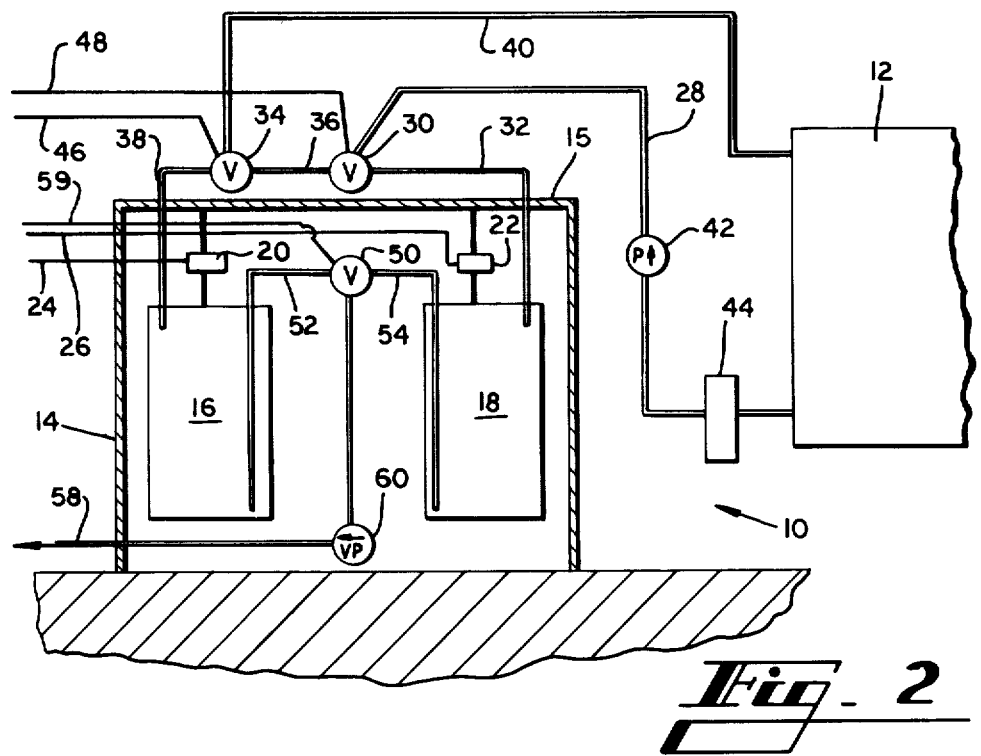
FIG. 2 is a side view of the liquid asphalt metering apparatus shown in FIG. 1 with a side of the enclosure for the apparatus removed to expose its contents, and showing the metering tanks in cross-section.
Figure 3:
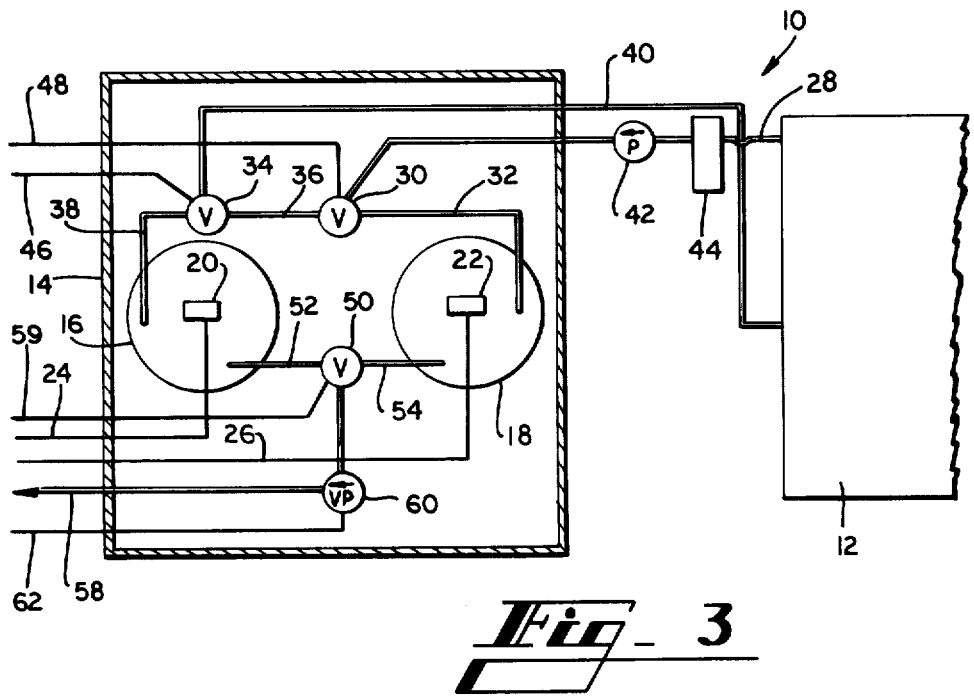
FIG. 3 is a top view of the liquid asphalt metering apparatus shown in FIG. 2 with the top of the enclosure for the apparatus removed.

The tanks 16, 18 are connected to the reservoir tank 12 through a series of pipes and valves. As best shown in FIGS. 2 and 3, liquid asphalt supply pipe 28 extends from the tank 12 to a two-way valve 30. One branch of the valve 30 is connected to the tank 18 by an inlet pipe 32. The other branch of the valve 30 is connected to another two-way valve 34 by a pipe 36. One branch of the valve 34 is connected to the tank 16 by another inlet pipe 38. The other branch of the valve 34 is connected to the reservoir tank 12 by a return pipe 40. A constant rate pump 42, connected to the supply pipe 28 at a point intermediate the metering tanks 16, 18 and the reservoir tank 12, pumps liquid asphalt from the reservoir tank toward the metering tanks 16, 18.

A filter 44 may be interposed between the reservoir tank 12 and the pump 42 to filter out extraneous matter in the liquid asphalt which might otherwise cause damage to the pump. It should be understood, however, that the filter element of the filter 44 may be of a coarser mesh than those necessarily used in the prior art to protect volumetric meters. A typical filter used with prior art metering apparatus is approximately 40 mesh; whereas a typical filter useful with the present invention may be approximately 10 mesh. It will therefore be appreciated by those skilled in the art that a filter used with the present invention is not as likely to become clogged with fine matter as are filters necessary to protect a prior art metering apparatus.

The valves 30, 34 are preferably electrically operable so that they may be remotely switched from one branch to the other. For this purpose the valves 30, 34 are connected by leads 46, 48 to the control circuit 27.

It will be appreciated by those skilled in the art that liquid asphalt pumped from the reservoir tank 12 through the supply pipe 28 may be directed by the valves 30, 34 to either the right metering tank 18 or the left metering tank 16; or if it is desired that neither tank 16, 18 be filled with liquid asphalt, the valves 30, 34 may be set to recirculate the liquid asphalt back to the reservoir tank 12 through the return pipe 40. This arrangement is preferable because, as described below, hot liquid asphalt is always flowing through the supply pipe 28 and almost always flowing through the return pipe 40. This provides an advantage in that liquid asphalt does not have an opportunity to cool and harden in the pipes 28, 40 or in the pump 42.

Each metering tank 16, 18 is connected to a branch of a two-way valve 50 by an outlet pipe 52, 54. The remaining branch of the valve 50 is connected to an asphalt dispenser 56 within a rotating drum 57 of the drum mix plant 11 by an output pipe 58, as shown in FIG. 1. The valve 50 is preferably electrically operable so that it may be remotely switched from one branch to the other. Furthermore, similar to valves 30, 34, the valve 50 is connected in the embodiment disclosed to the control circuit 27 by a lead 59.

A variable rate pump 60 is attached to the output pipe 58 at a point intermediate the valve 50 and the drum mix plant 11. The variable rate pump 60 is also connected to the control circuit 27 by a lead 62, shown in FIG. 3. The control circuit 27 therefore may actuate the valve 50 to alternately permit the variable rate pump 60 to pump liquid asphalt out of the left metering tank 16 or the right metering tank 18. Furthermore, the control circuit 27 may vary the rate at which the variable rate pump 60 pumps liquid asphalt from the tanks 16, 18 to the dispenser 56, in a manner known to those skilled in the art, in response to either a desired predetermined rate or in response to data supplied to the control circuit from other apparatus associated with the drum mix plant 11, such as weight information supplied by load cells (not shown) underlying aggregate storage bins 64 and connected to the control circuit by leads 66.

In one embodiment of the present invention the control circuit 27 as described herein includes two circuit components. One circuit component is a prior art device as described above, which, in the prior art, controlled a pump such as the pump 60 to deliver liquid asphalt to a drum mixer in response to a signal provided by a volumetric liquid asphalt meter and to signals corresponding to the amount and grade of aggregate being delivered to the drum mixer. In a system according to the invention, such a prior art device still controls the pump 60, but the signal formerly provided to the prior art device by a volumetric meter is provided by the second component of the control circuit 27. The second circuit component of the control circuit 27 is a circuit means which derives the signal thus provided to the first component from signals received from the load cells 20, 22, utilizing a separate microprocessor unit as described herein. The second circuit component of the control circuit 27 also coordinates the valves 30, 34 and 50 as described herein to determine which metering tank will provide liquid asphalt to the pump 60. It will be understood by those persons skilled in the art that the functions of the first and second circuit components can be combined in a single device, and that designing such a combined circuit would be within the skill of such persons.

Operation of the metering apparatus 10 is typically as described hereinafter. Assuming that the tanks 16, 18 are initially empty, the control circuit 27 sets the valve 30 so that liquid asphalt pumped from the reservoir tank 12 through the supply pipe 28 by the pump 42 is directed into the tank 18 through the inlet pipe 32. As the tank 18 fills with liquid asphalt, the weight of the tank and liquid asphalt contained therein applied to the load cell 22 increases. The load cell 22 continuously sends a signal through the lead 26 to the control circuit 27 which converts the signal into the corresponding weight of the tank 18 and the liquid asphalt contained therein. The weight thus monitored by the control circuit may be displayed on conventional display apparatus connected to the control circuit 27 and may be used for further computational purposes by the control circuit.

As the tank 18 continues to fill with liquid asphalt, the control circuit constantly monitors the weight of the tank 18 and the liquid asphalt contained therein. When that weight reaches a predetermined amount, typically corresponding to the weight of the tank 18 filled with liquid asphalt, the control circuit 27 switches the valve 30 so as to direct the flow of liquid asphalt from the supply pipe 28 to the valve 34 through the pipe 36. Simultaneously therewith, the control circuit 27 sets the valve 34 to direct the flow of liquid asphalt from the pipe 36 to the tank 16 through the inlet pipe 38. In a manner identical to the procedure for filling the tank 18, the control circuit 27 monitors the weight of the tank 16 and the liquid asphalt contained therein. When that weight corresponds to the weight of the tank 16 filled with liquid asphalt, the control circuit 27 switches the valve 34 to direct the flow of liquid asphalt from the pipe 36 back to the reservoir tank 12 through the return pipe 40.

It should be understood that the rate at which the pump 42 pumps liquid asphalt from the reservoir tank 12 to the metering tanks 16, 18 is preferably far greater than the rate at which the variable rate pump 60 can pump liquid asphalt from the metering tanks. In this manner, the pump 42 can refill one of the metering tanks 16, 18 while the pump 60 is emptying the other metering tank. This means that whenever the pump 60 has emptied one of the metering tanks 16, 18 the control circuit 27 switches the valve 50 to the other metering tank which will always be full. It will also be appreciated that since the liquid asphalt may be recirculated back into the tank 12 through the return pipe 40 when, for example, both tanks 16, 18 are filled with liquid asphalt, starting and stopping of the pump 42 is not required.

Furthermore, the pipes 28, 36, 40, pump 42 and filter 44 are less likely to become clogged with liquid asphalt which has solidified from cooling because the liquid asphalt is being pumped at frequent intervals through all parts of the system.

As soon as one of the tanks 16, 18 is full of liquid asphalt, the metering apparatus 10 is ready to begin metering out liquid asphalt from the full tank. Assuming the tank 18 is a full tank, the control circuit 27 sets the valves 30, 34 to either fill the tank 16, if it is empty, or to recirculate the liquid asphalt back to the reservoir tank 12, if the tank 16 is full. In either event, it is essential that no more liquid asphalt be added to the tank 18 while a metering delivery operation is in progress.

The control circuit 27, in response to sensing a weight from the load cell 22 equal to a predetermined "full" weight, then sets the valve 50 so that liquid asphalt may be pumped out of the tank 18 by the variable rate pump 60, and then starts the variable rate pump 60 pumping liquid asphalt from the tank 18 to the dispenser 56 in the rotating drum 57 where the liquid asphalt is mixed with aggregate material therein to coat the aggregate material for production of a finished asphalt-aggregate product.

In order to achieve proper coating of the aggregate material in the drum 57 the rate at which liquid asphalt is delivered to the dispenser 56 by the variable rate pump 60 must be at a rate proper for treatment of the amount and grade of aggregate material in the drum. The amount and grade of aggregate material in the drum 57 is determined by the control circuit 27 based upon the signals received from load cells (not shown) under the aggregate storage bins 64, which contain different grades of aggregate. That is, the decrease in weight of each of the bins 64 is equal to the weight of the aggregate material dispensed therefrom. Taking into account the time lag required for the aggregate material to travel from the bins 64 to the location of the dispenser 56 in the drum 57, the control circuit 27 thus constantly monitors the amount of aggregate material flowing through the drum 57 and calculates the amount of liquid asphalt required to properly treat the aggregate material based on formulae programmed into the control circuit and known to those skilled in the art.

As the variable rate pump 60 pumps liquid asphalt from the tank 18 to the dispenser 56, the control circuit 27 constantly monitors the weight of the tank and the liquid asphalt contained therein. As liquid asphalt is pumped out of the tank 18 the weight registered by the load cell 22 will decrease. The control circuit 27 compares this actual rate with the required rate calculated based on the amount of aggregate material flowing through the drum 57. If the actual rate is less than the required rate, the control circuit 27 speeds up the variable rate pump 60 to thereby pump liquid asphalt from the tank 18 at a greater rate. If the actual rate is greater than the required rate, the control circuit 27 slows down the variable rate pump 60 to pump liquid asphalt from the tank 18 at a lesser rate. It will be understood that the control circuit 27 performs this operation continuously so that the actual rate at which liquid asphalt is pumped from the tank 18 is constantly maintained at the rate necessary to properly treat the aggregate material in the drum 57.

Alternately, a constant desired rate not dependent on the actual aggregate flow may be programmed into the control circuit 27 through control inputs (not shown). The control circuit 27 may then compare the actual rate with the desired rate and make the necessary changes in the speed of the variable rate pump 60 to achieve and maintain the desired rate.

When the weight of the tank 18 and the liquid asphalt contained therein measured by the load cell 22 has dropped a predetermined amount, preferably corresponding to the weight of the empty or nearly empty tank 18, the control circuit 27 switches the valve 50 so that liquid asphalt is pumped by the variable rate pump 60 from the tank 16, which has already been filled with liquid asphalt from the reservoir tank 12 while the tank 18 was being emptied. Simultaneously therewith, the control circuit switches the valve 30 so that the tank 18 will be refilled with liquid asphalt 18 from the reservoir tank 12 while the tank 16 is being emptied. When the tank 18 has been refilled with liquid asphalt, and the load cell 22 again senses the predetermined "full" weight, the control circuit sets the valves 30, 34 so that liquid asphalt is recirculated back to the reservoir tank 12 through the return pipe 40.

The same weight monitoring operations as were performed with the tank 18 are performed on the tank 16 as it is being emptied. The rate of loss of weight registered at the load cell 20 is equal to the rate at which liquid asphalt is pumped out of the tank 16; and the control circuit 27 regulates the speed of the variable pump 60 to attain a desired rate of flow of liquid asphalt through the output pipe 58. It will be appreciated that the use of two metering tanks with which to alternate the weigh-out operation permits the metering apparatus 10 to measure out liquid asphalt in a continuous manner. Although the present invention is illustrated as having two such metering tanks, it is specifically contemplated that any desired number of metering tanks may be used, but preferably two tanks are to be used. It will be further noted that the broad concept of the invention may be practiced intermittently using only one metering tank.

It is also contemplated that the rate at which liquid asphalt is measured out of the metering apparatus 10 may be calculated in response to different parameters than the amount of aggregate flowing through the drum 57. Such calculations may be based, for example, on temperature parameters, gas flow through the drum, speed of rotation of the drum or the like. Measurement of such parameters and their input into the microprocessor 27 are within the skill of the art.

It will be appreciated by those skilled in the art that by weighing-out liquid asphalt from the metering apparatus of the present invention, many of the problems associated with volumetric metering apparatus of the prior art, such as temperature dependence, are eliminated. Although the temperature of the liquid asphalt will slowly decline during the presence of the liquid asphalt in the metering tanks, this has no effect on the weight of liquid asphalt accurately delivered to the drum mix plant.

It will be understood, of course, that the foregoing relates only to a preferred embodiment of the present invention and that many modifications or alterations may be made therein without departing from the spirit and scope of the invention as set forth in the appended claims.

We claim:

1. Apparatus for metering-out liquid asphalt, said apparatus comprising:
   a plurality of tanks for containing a quantity of liquid asphalt;
   a load cell for each tank;
   means for applying the weight of each of said tanks and contents thereof to said tank's load cell;
   means for filling each tank with liquid asphalt; and
   means, responsive to said load cells, for selectively removing liquid asphalt from said tanks at a desired rate by weight.

2. Apparatus of claim 1, wherein said apparatus comprises two tanks.

3. Apparatus of claim 1 wherein said filling means is responsive to said load cells.

4. Apparatus of claim 2 or 3 further comprising:
   means for alternately filling said tanks with liquid asphalt; and
   means for alternately removing liquid asphalt from said tanks.

5. Apparatus of claim 4, wherein said removing means comprises a pump selectively connectable to said tanks for selectively pumping liquid asphalt out of either of said tank.

6. Apparatus of claim 5, wherein said pump is a variable rate pump.

7. Apparatus of claim 6 further comprising means for controlling the rate of said variable pump.

8. Apparatus of claim 7, wherein said control means is responsive to said weighing means.

9. An apparatus for delivering liquid asphalt comprising:
   a first container holding liquid asphalt;
   weighing means for continuously measuring the weight of said first container and liquid asphalt therein;
   means for removing liquid asphalt from said first container so as to reduce the weight of said first container and liquid asphalt therein measured by said weighing means at a desired rate independent of the volume rate of removal of said liquid asphalt;
   a second container holding liquid asphalt;
   means for continuously measuring the weight of said second container and liquid asphalt therein; and
   control means operative to:
   terminate removal of liquid asphalt from said first container following removal of a predetermined weight of liquid asphalt therefrom; and
   remove liquid asphalt from said second container so as to reduce the weight of said second container and liquid asphalt therein at said desired rate.

10. The apparatus of claim 9 wherein said control means is further operative to:
    monitor the rate at which the weight of said first or said second container and liquid asphalt therein is being reduced; and,
    responsive to said rate at which said weight is being reduced being other than said desired rate, adjusting said removal of liquid asphalt to maintain said predetermined rate of removal.

11. The apparatus of claim 10 further comprising:
    an asphalt plant;
    means for delivering liquid asphalt removed from said first and second containers to said asphalt plant;
    a plurality of bins containing aggregate of differing grades;
    means for delivering aggregate from said bins to said asphalt plant in selected proportions;
    means for measuring the amount of each grade of aggregate delivered to said asphalt plant; and
    means for varying said removal of liquid asphalt from said container responsive to variations in the amount and grade composition of aggregate in said asphalt plant.

12. An apparatus for delivering liquid asphalt comprising:
   a storage tank for liquid asphalt;
   a first delivery tank and a second delivery tank for liquid asphalt;
   a first weighing means and a second weighing means for continuously measuring the weight of said first and second delivery tanks and the contents thereof, respectively;
   a first pump operative to pump liquid asphalt from said storage tank;
   a second pump operative to pump liquid from one of said first and second delivery tanks to a receptacle; and
   valve control means operative to
   (1) connect said second pump to said first delivery tank until the weight of said first tank and the contents thereof reaches a predetermined minimum weight, and thereafter to connect said second pump to said second delivery tank; and
   (2) connect said first pump to said second delivery tank until either said second pump is connected to said second delivery tank or the weight of said second tank reaches a predetermined maximum weight, and thereafter to connect said first pump to said first delivery tank, or, if said first tank has previously reached said maximum weight or is connected to said second pump, to connect said first pump to a return line for recirculating said liquid asphalt to said storage tank.

13. Method of metering-out liquid asphalt, said method comprising the steps of:
   at least partially filling a first tank with liqud asphalt;
   removing liquid asphalt from said first tank;
   continuously weighing said first tank and liquid asphalt contained therein while liquid asphalt is being removed from said first tank;
   determining the rate at which liquid asphalt is being removed from said first tank by determining the rate of weight loss of said first tank and liquid asphalt contained therein; and
   at least partially filling a second tank with liquid asphalt while liquid asphalt is being removed from said first tank.

14. The method of claim 13 further comprising the steps of:
   removing liquid asphalt from said second tank instead of said first tank when a desired amount of asphalt has been removed from said first tank;
   continuously weighing said second tank and liquid asphalt contained therein while liquid asphalt is being removed from said second tank; and
   determining the rate at which liquid asphalt is being removed from said second tank by determining the rate of weight loss of said second tank and liquid asphalt contained therein.

15. The method of claim 14 further comprising the step of at least partially filling said first tank with liquid asphalt while liquid asphalt is being removed from said second tank.

16. The method of claim 15 further comprising the steps of:
   determining a desired rate of removal of liquid asphalt from one of said tanks;
   comparing the rate of weight loss of said one tank and liquid asphalt contained therein; and
   adjusting the rate of removal of liquid asphalt from said one tank to attain and maintain said desired rate.

17. A method of delivering liquid asphalt from a first container comprising the steps of:
   continuously measuring the weight of said first container and liquid asphalt contained therein;
   delivering liquid asphalt from said first container so as to reduce the weight of said first container and liquid asphalt contained therein at a desired rate;
   selectively terminating delivery of liquid asphalt from said first container;
   continuously measuring the weight of a second container and liquid asphalt contained therein;
   delivering liquid asphalt from said second container so as to reduce the weight of said second container and liquid asphalt contained therein at said desired rate; and
   refilling said first container with liquid asphalt.

18. In a method of preparing an asphalt-aggregate product including continuously delivering aggregate of differing grades in selected proportions to a rotating drum, and continuously delivering liquid asphalt from a container to said drum, the improvement comprising the steps of:
   continuously weighing said container;
   responsive to variations in the amount and grade of said aggregate delivered to said drum, continuously determining a desired rate of delivery of liquid asphalt by weight to said drum; and
   responsive to the weight of said container, continuously adjusting the rate of delivery of liquid asphalt from said container to said drum to maintain said desired rate.

19. In an asphalt plant including a rotating drum, a plurality of bins containing aggregate of differing grades, means for continuously delivering aggregate from said bins to said drum in selected proportions of said grades of aggregate, a container holding liquid asphalt, and means for continuously delivering said liquid asphalt from said container to said drum, the improvement comprising:
   weighing means supporting said container of liquid asphalt; and
   control means responsive to variations in the amount and grade composition of said aggregate delivered to said drum for continuously determining a desired rate of delivery of liquid asphalt by weight to said drum, and responsive to said weighing means for continuously adjusting the rate of delivery of liquid asphalt from said container to said drum to maintain said desired rate.

* * * * *